(12) United States Patent
Monteverde et al.

(10) Patent No.: US 12,415,223 B2
(45) Date of Patent: Sep. 16, 2025

(54) CUT-OFF SAW

(71) Applicant: Robert Bosch GmbH, Stuttgart (DE)

(72) Inventors: Richard Monteverde, Chicago, IL (US); Ramon Tam, Buffalo Grove, IL (US)

(73) Assignees: Robert Bosch Power Tools GmbH, Leinfelden-Echterlingen (DE); Robert Bosch GmbH, Stuttgart (DE)

( * ) Notice: Subject to any disclaimer, the term of this patent is extended or adjusted under 35 U.S.C. 154(b) by 284 days.

(21) Appl. No.: 18/207,874

(22) Filed: Jun. 9, 2023

(65) Prior Publication Data
US 2024/0408684 A1 Dec. 12, 2024

(51) Int. Cl.
*B23D 45/16* (2006.01)
*B23D 47/12* (2006.01)
*B25F 5/00* (2006.01)
*B25F 5/02* (2006.01)

(52) U.S. Cl.
CPC .............. *B23D 45/16* (2013.01); *B23D 47/12* (2013.01); *B25F 5/008* (2013.01); *B25F 5/02* (2013.01)

(58) Field of Classification Search
CPC .......... B23D 47/12; B23D 45/16; B25F 5/008
See application file for complete search history.

(56) References Cited

U.S. PATENT DOCUMENTS

| | | | |
|---|---|---|---|
| 5,199,389 A * | 4/1993 | Wolf | F01N 13/002 30/381 |
| 7,311,067 B2 * | 12/2007 | Riehmann | B24B 55/052 123/41.7 |
| 8,256,396 B2 | 9/2012 | Emmench et al. | |
| 8,389,143 B2 | 3/2013 | Robkamp et al. | |
| 8,757,288 B2 | 6/2014 | Heinzelmann et al. | |
| 8,869,912 B2 | 10/2014 | Robkamp et al. | |
| 10,220,457 B2 | 3/2019 | Kume et al. | |
| 10,704,510 B2 * | 7/2020 | Wolf | F02M 35/02483 |
| 11,338,426 B2 | 5/2022 | Rudolph | |
| 2010/0218386 A1 | 9/2010 | Robkamp et al. | |
| 2012/0080098 A1 * | 4/2012 | Makiyama | B23Q 11/1046 137/154 |
| 2017/0306900 A1 * | 10/2017 | Döring | F02M 35/0223 |
| 2018/0207831 A1 | 7/2018 | Masatoshi et al. | |
| 2018/0290322 A1 | 10/2018 | Wang et al. | |
| 2021/0205904 A1 | 7/2021 | Schmitz et al. | |

FOREIGN PATENT DOCUMENTS

| | | |
|---|---|---|
| DE | 102016106559 | 10/2017 |
| EP | 2223777 | 11/2015 |
| EP | 3216567 | 9/2017 |
| WO | 2022117336 | 6/2022 |

OTHER PUBLICATIONS

Milwakee 9" Cutoff Saw 2786-20.
Milwaukee Operator's Manual.
Milwaukee Service Parts List.

* cited by examiner

*Primary Examiner* — Sean M Michalski
(74) *Attorney, Agent, or Firm* — Kelly McGlashen

(57) ABSTRACT

A cut-off saw includes a saw housing having a support arm that protrudes outward from the housing front end and supports a rotatable cutting blade. A blade drive assembly disposed in the support arm includes a gear set and is configured to transmit rotational motion of a motor to the cutting blade. The saw housing includes housing features that are configured to minimize entrance of water into the interior space in applications where cutting is water cooled.

19 Claims, 8 Drawing Sheets

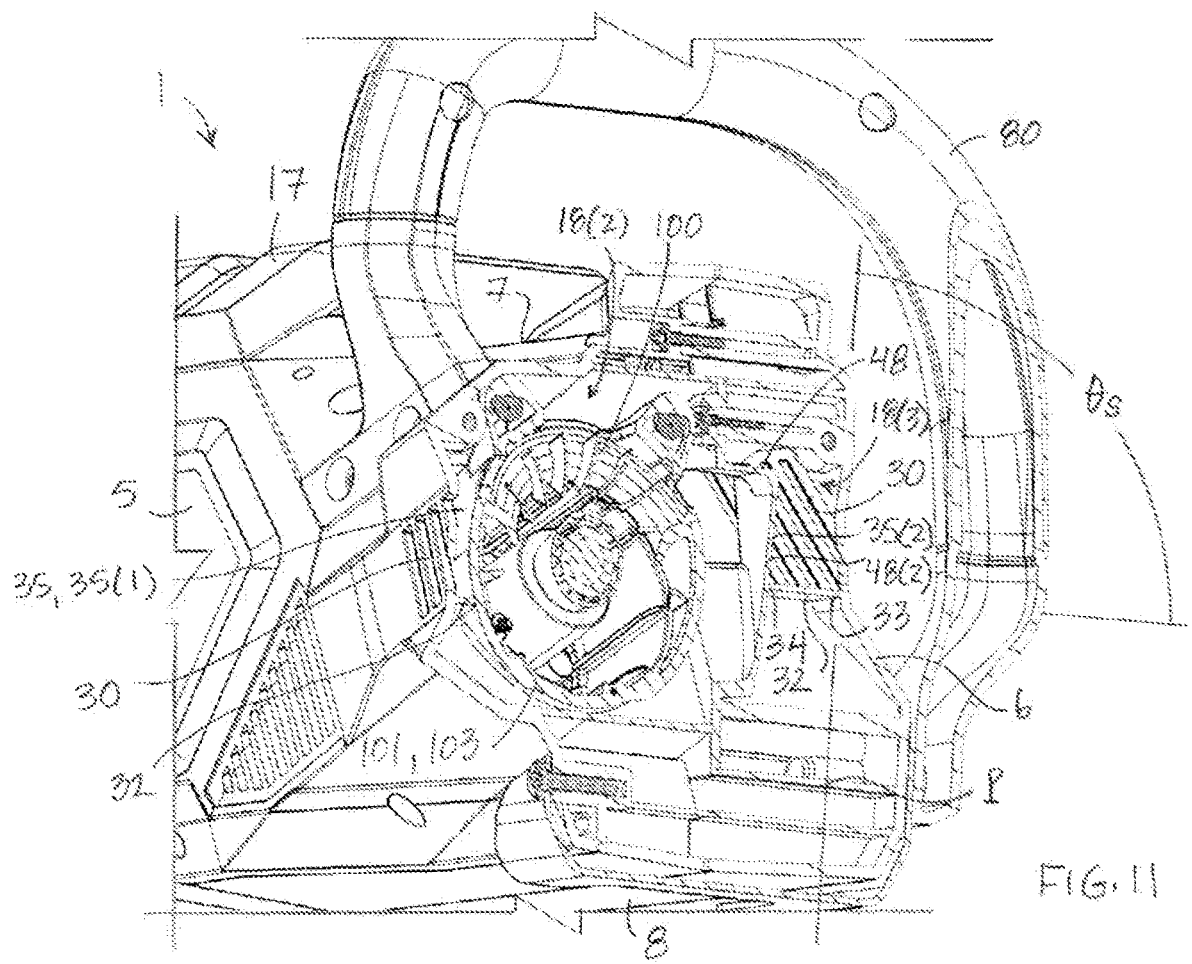

CUT-OFF SAW

BACKGROUND

A cut-off saw is a hand-held power tool that employs a circular blade that is mounted in front of the saw housing. A cut-off saw is free of a lower blade guard and often drives a cutting blade having a diameter that is in a range of eight to fourteen inches. This type of saw is designed to be a versatile solution for cutting a large variety of heavy materials, including reinforced concrete, other masonry materials, and metals including iron and black pipe. In some applications, the saw may incorporate water cooling of the saw blade during operation for efficient cutting of the heavy materials. It is desirable to provide a cut-off saw having a saw housing configured to permit air cooling of internal saw components while preventing ingress of the cooling water into the saw housing.

SUMMARY

A cut-off saw includes a saw housing, a brushless electric motor disposed within the saw housing, and a battery pack coupled to the saw housing that provides power to the motor and a printed circuit board assembly (PCBA). The cut-off saw further includes a blade drive assembly disposed in a support arm that protrudes from a front end of the saw housing. The blade drive assembly couples a cutting blade to the cut-off saw and transmits the rotational output of the motor to the cutting blade. The saw housing includes a rear handle that extends from a rear end of the saw housing. In addition, an auxiliary handle overlies an upper side of the saw housing. The battery pack is disposed in a battery compartment defined by the saw housing. The battery compartment is positioned between the motor and the rear handle, and the battery pack is accessible via a battery cover that is detachably coupled to the saw housing.

The housing defines rear-facing air inlet openings adjacent the rear handle in communication with an interior of the housing. In addition, the housing defines side-facing air outlet openings adjacent the motor and in communication with the interior of the housing. In response to activation of the motor, the motor and a motor driven fan draw cooling air flow through the rear air intake openings. After passing through the interior space of the saw housing, the cooling air flow is discharged from the side-facing air outlet openings.

Because the cut-off saw may be used to cut heavy materials, the saw may incorporate water cooling of the saw blade during operation. For this reason, the saw housing includes housing features that are configured to inhibit or minimize entrance of liquid into the interior space of the saw housing via the inlet and outlet openings that permit air cooling of the saw. The housing features that inhibit ingress of liquid into the saw housing may include providing louvers for each slot of the inlet and/or outlet opening. The housing features that inhibit ingress of liquid into the saw housing may include a shelf that protrudes inward from an interior surface of the first side, the shelf aligned with the opening and serving as a floor that may direct fluid to the outside of the saw. In some embodiments, the shelf is associated with an internal wall structure that serves as a back stop that redirects flow out of the housing and/or as part of a tortuous path between the inlet or outlet opening and the components within the housing. In some embodiments, the housing features include a shielding wall portion that protrudes from an inner surface of the saw housing into a recess of a saw component. For example, the motor housing may include recesses between motor mounting bosses. The recesses facilitate outflow of air from the motor fan. The shielding wall portion has the same shape and dimensions as the recess, and by its position within the recess the shielding wall portion obstructs fluid flow into the motor.

In some aspects, a saw includes a saw housing. The saw housing includes a front end, a rear end, a first side, a second side, a third side, a fourth side, a longitudinal axis that extends through the front end and the rear end, and a hollow support arm that protrudes outward from the front end. The rear end is opposite the front end. The first side, the second side, the third side, the fourth side, the front end and the rear end cooperate to define an interior space of the saw housing. The rear end includes a housing rear inlet opening that permits fluid communication between an environment of the saw and the interior space. The first side includes a housing side outlet opening disposed between the rear end and the front end. The housing side outlet opening permits fluid communication between the environment of the saw and the interior space. The saw includes an electric motor disposed in the interior space, the electric motor including an output shaft that lies in a plane that is parallel to the longitudinal axis and is rotatable about an output shaft axis. The saw includes a motor fan driven by the output shaft and configured to draw cooling air through the saw housing. The saw includes a blade drive assembly disposed in the support arm, the blade drive assembly configured to detachably connect a cutting blade to the support arm and transmit a rotational motion of the output shaft to the cutting blade when the cutting blade is connected to the saw. In addition, the saw includes a printed circuit board assembly that supports electronics configured to control operation of the saw, the printed circuit board assembly being disposed in the interior space. The saw housing includes housing features that are configured to minimize entrance of water into the interior space.

In some embodiments, the first side and the second side correspond to opposed lateral sides of the saw housing, the third side corresponds to a top of the saw housing and the fourth side of the saw housing corresponds to a bottom of the saw housing. The saw comprises a handle having a first end connected to the first side, a second end connected to the second side and a mid portion that faces and is spaced apart from the third side. The housing side outlet opening is disposed in the first side between the third side and the fourth side. The housing features comprise a shelf that protrudes inward from an interior surface of the first side, the shelf disposed between the housing side outlet opening and the fourth side.

In some embodiments, the shelf comprises a proximal end that adjoins the first side and a distal end that is opposite the proximal end and spaced apart from the first side, and the housing features comprise a facing wall disposed at the shelf distal end, the facing wall extending upward relative to the shelf toward the third side.

In some embodiments, the shelf protrudes inward from an interior surface of the first side at a shelf angle relative to the first side, the shelf angle being configured to promote the flow of liquid to an exterior of the saw housing.

In some embodiments, the shelf protrudes inward from an interior surface of the first side at a shelf angle relative to the first side, and the shelf angle is an acute angle relative to a plane that includes the housing side outlet opening.

In some embodiments, the housing side outlet opening is disposed in the first side at a location that is longitudinally aligned with the motor.

In some embodiments, each of the housing rear inlet opening and the housing side outlet opening comprises an array of slots, the material between the slots forming a grill configured to prevent material having dimensions greater than a width of the slot from entering the interior space, and the shelf is disposed along an edge of the grill.

In some embodiments, the housing features include an upright wall portion that faces the housing outlet opening and is spaced apart from the housing outlet opening; and a shelf that underlies the housing outlet opening and protrudes inward from the first side toward the upright wall portion.

In some embodiments, the housing features comprise wall portions disposed in the interior space, the wall portions arranged to provide a tortuous fluid path between at least one of the housing rear inlet opening and the housing side outlet opening and at least one of the motor and the printed circuit board assembly.

In some embodiments, at least a first one of the wall portions is parallel or substantially parallel to the longitudinal axis, and at least a second one of the wall portions is perpendicular to the first one of the wall portions.

In some embodiments, at least some of the wall portions are arranged to form an enclosed passage portion.

In some embodiments, the housing features include a tubular baffle that forms a portion of a tortuous air flow path in the interior space.

In some embodiments, each of the housing rear inlet opening and the housing side outlet opening comprises an array of slots, the material between the slots forming a grill configured to prevent material having dimensions greater than a width of the slot from entering the interior space.

In some embodiments, a battery pack is disposed in the interior space between the electric motor and the rear end, and the battery pack is configured to supply power to the electric motor.

In some embodiments, the motor is housed within a motor housing, and the motor housing includes a motor housing first end and mounting bosses that are spaced apart about a circumference of the motor housing first end. The mounting bosses are configured to receive a fastener. The motor housing includes recesses that are formed in the motor housing first end such that one of the recesses is disposed between the mounting bosses of each adjacent pair of mounting bosses. The output shaft of the motor protrudes from the motor housing first end. The housing features include a shielding wall portion that protrudes from an inner surface of the saw housing into one of the recesses, the shielding wall portion serving as a barrier to liquid flow through the recess.

In some embodiments, the shielding wall portion is shaped and dimensioned to complement the shape and dimension of the one of the recesses in such a way that motor housing and the shielding wall portion cooperate to inhibit the flow of liquid into the motor via the one of the recesses.

In some embodiments, the remaining recesses are free of a shielding wall portion.

In some embodiments, the shielding wall portion protrudes from a rear-facing surface of the support arm.

In some embodiments, the housing outlet opening is longitudinally aligned with the shielding wall portion.

BRIEF DESCRIPTION OF THE FIGURES

FIG. 11 is a cross-sectional view of the cut-off saw as seen along line 11-11 of FIG. 5.

FIG. 12 is an enlarged cross-sectional view of a housing side outlet opening.

DETAILED DESCRIPTION

Figure 1:
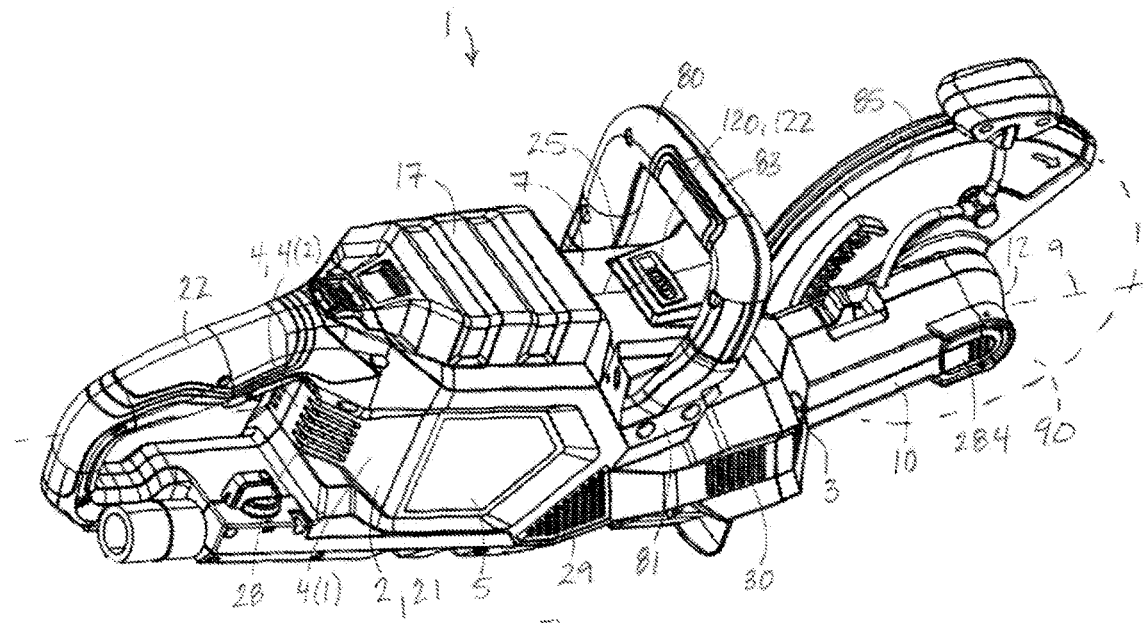
FIG. 1 is a perspective view of a first side of a cut-off saw.

Referring to FIGS. 1-5, a cut-off saw 1 is a hand-held power tool that is configured to support and drive for rotation a cutting blade 90. The cutting blade 90 is circular and may be a segmented blade, an abrasive disk, or any other rotatable element capable of removing material from a workpiece. In some embodiments, the cutting blade 90 may have an outer diameter that is in a range of eight to fourteen inches. For example, the cutting blade 90 may have a nine inch diameter. The cut-off saw 1 includes a saw housing 2 that encloses an electric motor 101 that is configured to drive the cutting blade 90, a battery pack 116 that is configured to supply power to the electric motor 101, a printed circuit board assembly (PCBA) 112 that supports control electronics including a controller (not shown), and other saw components as will be described in detail below. The saw housing 2 includes a main handle 22 that protrudes from a rear end 4 of the saw housing 2, and a support arm 10 that protrudes from a front end 3 of the saw housing 2 in a direction opposite that of the main handle 22. The cutting blade 90 may be quickly and easily mounted to or detached from the distal end 12 of the support arm 10. The saw housing 2 includes features that prevent or inhibit ingress of water into the saw housing. These and other features of the saw housing 2 will be described in detail below.

A blade drive assembly 200 is housed within the hollow support arm 10. The blade drive assembly 200 is configured to detachably connect the cutting blade 90 to the support arm distal end 12 and transmit a rotational motion of an output shaft 102 of the electric motor 101 to the cutting blade 90 when the cutting blade 90 is connected to the cut-off saw 1. The blade drive assembly 200 includes a blade lock handle 284 that is configured to lock the blade drive assembly 200 so that the cutting blade 90 can be attached to or removed from the cut-off saw 1. The lock handle 284 may be pivoted into an orientation in which the lock handle 284 also serves as handle that permits the user to more easily control a position of the cut-off saw during cutting blade attachment and detachment.

The saw housing 2 is a clamshell housing having left and right cooperating half shells 20, 21 that are joined along a parting line 25 that extends from the front end 3 to the rear end 4. The saw housing 2 is elongated along a housing longitudinal axis 9 that is parallel to the parting line 25 and extends through the opposed front and rear ends 3, 4. The saw housing 2 has four sides that extend between the front end 3 and the rear end 4, including a first side 5, a second side 6, a third side 7 and a fourth side 8. When the cut-off saw 1 is oriented as shown in FIG. 1, the first side 5 and the second side 6 provide the lateral, or side, surfaces of the saw housing 2. In addition, the third side 7 provides a top surface and the fourth side 8 provides a bottom surface. The fourth side 8 is substantially parallel to the housing longitudinal axis 9. As used herein, the term "substantially parallel" refers to the exact state as well as minor variations due to manufacturing and assembly variations. Thus, the fourth side 8 may be exactly parallel to the housing longitudinal axis 9 or may be slightly angled relative to the housing longitudinal axis 9, for example as much as plus or minus five degrees. The first side 5, the second side 6, the third side 7, the fourth side 8, the front end 3 and the rear end 4 cooperate to define an interior space 18 of the saw housing 2.

Figure 6:
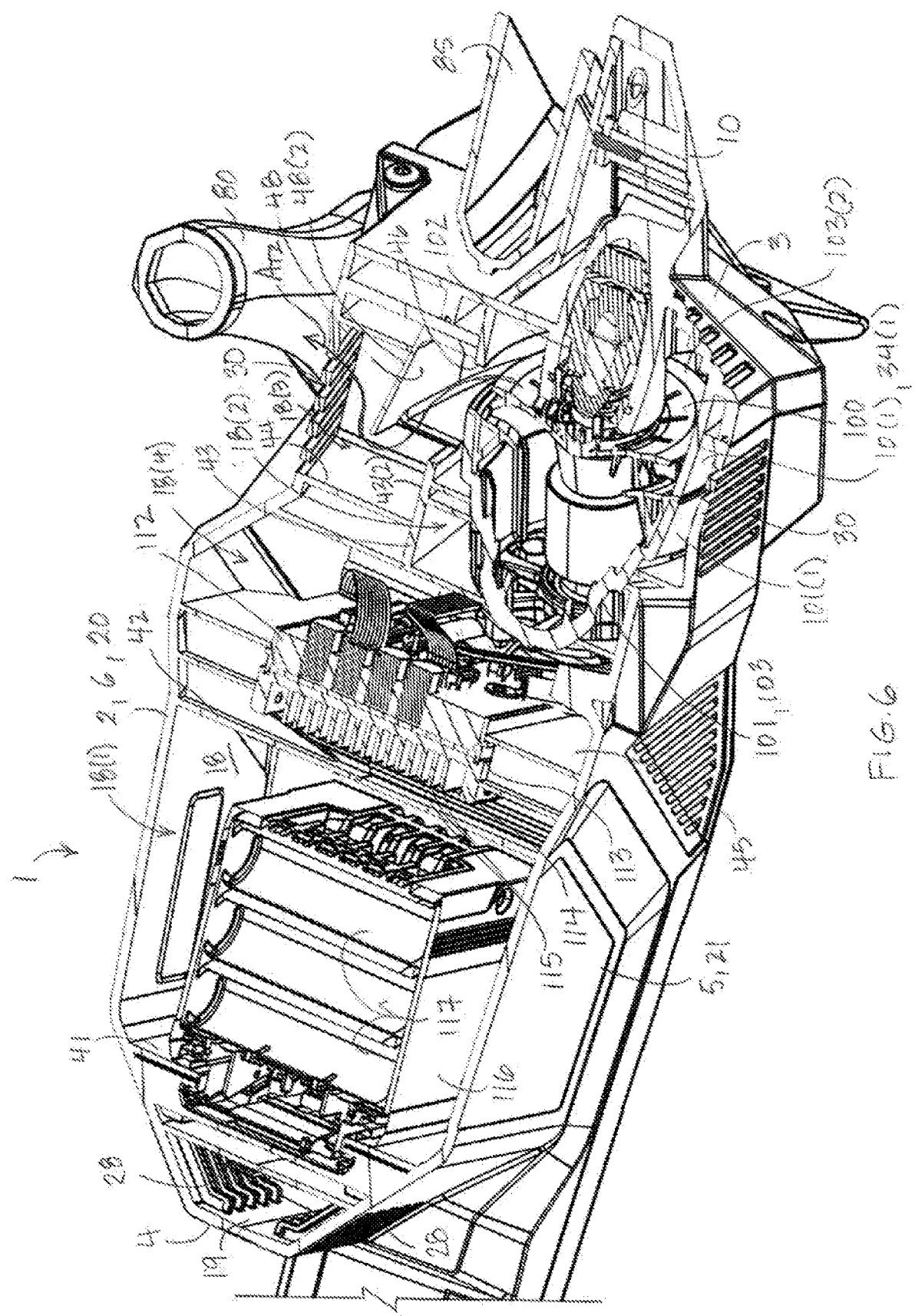
FIG. 6 is a cross-sectional view of the cut-off saw as seen along line 6-6 of FIG. 7.
Figure 7:
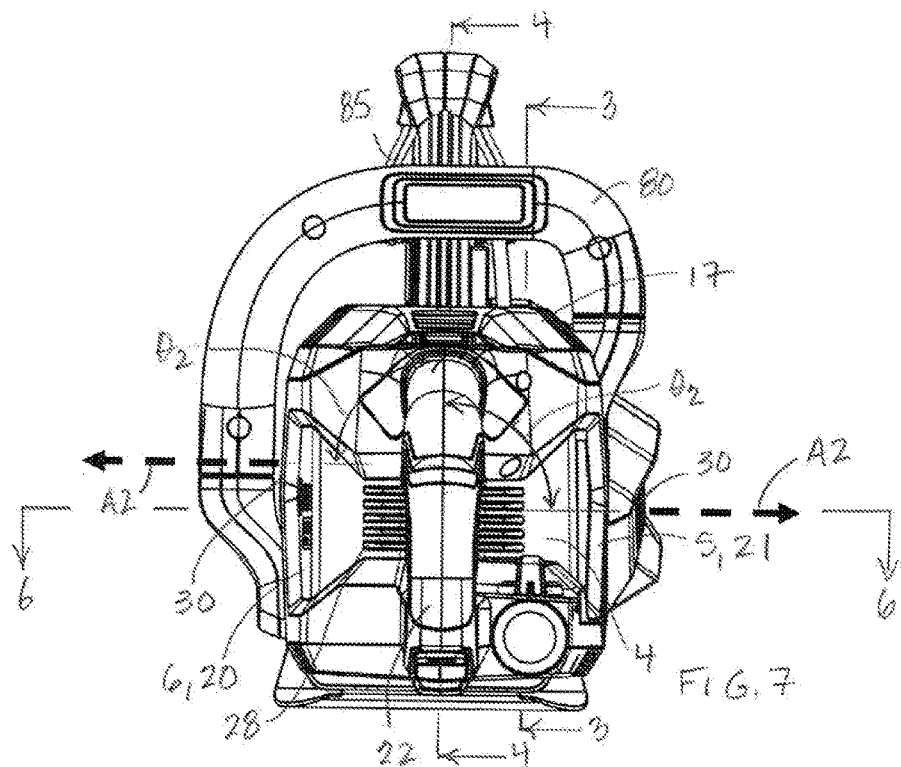
FIG. 7 is a rear view of the cut-off saw where broken arrows show air discharge directions.

Referring to FIG. 6, the saw housing 2 includes first and second partitioning walls 41, 42 that are disposed in the interior space 18 and extend laterally between the housing first and second sides 5, 6. The first partitioning wall 41 is disposed between the second partitioning wall 42 and the rear end 4 such that a narrow gap 19 is disposed between the first partitioning wall 41 and the rear end 4.

The first and second partitioning walls 41, 42 cooperate to form a first compartment 18(1) that is disposed near the rear end 4 and is separate from the remainder of the interior space 18. The first compartment 18(1) is configured to receive the battery pack 116, and thus is also referred to as the battery compartment.

The saw housing fourth side 8 closes a lower end of the first compartment 18(1), whereas an upper end of the first compartment 18(1) is closed by a detachable lid 17. References to relative direction such as upper, lower, lateral, above, below, top, bottom, etc. are made herein with respect to the orientation of the cut-off saw 1 shown in FIG. 1 for purposes of description and are not intended to be limiting since it is understood that the cut-off saw 1 may be used and/or stored in any orientation.

The first partitioning wall 41 may support electrical contacts 40 that are configured to form an electrical connection with corresponding electrical contacts (not shown) of the battery pack 116. In some embodiments, the electrical contacts 40 may be disposed on the first partitioning wall 41 between the first compartment inlet apertures 37(1), 37(2) and the fourth side 8. Thus, as cooling air flow is drawn around the battery pack 116 from the upper portion of the battery compartment to the lower portion of the battery compartment, the electrical contacts 40 are disposed in the cooling air flow path, facilitating improved cooling of the battery pack 116 as compared to some other saws. In addition, by providing multiple inlet apertures and multiple outlet apertures, the volume of air flow through the first compartment is made large.

The area of the interior space 18 disposed between the first compartment 18(1) and the front end 3 is further segregated by a third partitioning wall 43 that extends from the front end 3 toward the rear end 4 in a direction parallel to the housing longitudinal axis 9. The third partitioning wall 43 resides generally midway between the first and second sides 5, 6. A second compartment 18(2) that houses the electric motor 101 is defined between the third partitioning wall 43, the second half shell 21 and the housing front end 3. A third compartment 18(3) is defined between the third partitioning wall 43, the first half shell 20, the front end 3 and a fourth partitioning wall 44. The fourth partitioning wall 44 is disposed at the rear-most end of the third partitioning wall 43 and extends laterally between the third partitioning wall 43 and the housing second side 6.

A space 18(4) exists between the second partitioning wall 42 and the third and fourth partitioning walls 43, 44. The PCBA 112 is disposed in the space 18(4) and is oriented such that the printed circuit boards (PCBs) of the PCBA 112 are perpendicular to the housing longitudinal axis 9. The second compartment 18(2) opens rearward to communicate with the space 18(4), whereas the third compartment 18(3) is separated from the space 18(4) by the fourth partitioning wall 44.

The second and third compartments 18(2) and 18(3) are in fluid communication via an opening 46 in the third partitioning wall 43 as discussed in detail below.

Referring to FIGS. 1, 2 and 6-10, each of the two half shells 20, 21 of the saw housing 2 includes a housing rear inlet opening 28 formed in the rear end 4, whereby the saw housing 2 includes a pair of housing rear inlet openings 28. Each of the housing rear inlet openings 28 communicates with the saw housing interior space 18. In particular, each of the housing rear inlet openings 28 communicates with the gap 19 that is disposed between the rear end 4 and the first partitioning wall 41. As seen when the saw housing 2 is viewed from the rear, the rear end 4 includes surfaces 4(1) that are acutely angled relative to the housing longitudinal axis 9 which are joined by a central surface 4(2) that is perpendicular to the longitudinal axis 9. A housing rear inlet opening 28 is disposed on each of the angled surfaces 4(1) and includes a portion that extends into the central surface 4(2). As a result, each of the housing rear inlet openings 28 are correspondingly angled relative to the housing longitudinal axis 9.

The housing rear inlet openings 28 are each constituted by an array of closely-spaced, narrow slots 28a that are formed through the thickness of the rear end 4. The slots 28a extend laterally and the surfaces 28b of the slots 28a are parallel to a line that is normal to the rear end 4. By this configuration, air enters the interior space 18 via the slots 28a in a direction normal to the portion of the rear end 4 in which the housing rear inlet opening 28 is formed. The material between the slots 28a forms a grill configured to prevent material having dimensions greater than a width of the slot 28a from entering the interior space 18.

The slots 28a that form the housing rear inlet openings 28 each include a louver 28c that allows flow of air through the respective slot 28a but prevents or inhibits ingress of liquid into the saw housing 2. Each louver 28c protrudes inward from an inner surface of the saw housing 2 and includes a shelf portion 28d and a wall portion 28e. The shelf portion 28d is cantilevered from the housing 2 and is aligned with a lower surface 28b of the slot 28a. The shelf portion 28d may be perpendicular to the housing 2 or may be slightly angled relative to the housing 2 to promote flow of liquid toward the exterior of the housing 2. The wall portion 28e is disposed along the innermost edge of the shelf portion 28d and protrudes upward from the shelf portion 28d. In the illustrated embodiment, the wall portion 28e an upstanding structure having a height that is equal to or less than a height of the slot 28a. By this configuration, air flow entering the slots 28a is forced to travel a tortuous path to enter the saw housing 2. The tortuous path is represented by an arrow $A_{T1}$ in FIG. 10. In addition, the wall portion 28e of each slot 28a provides a stop surface that blocks entry of liquid into the housing 2 and deflects liquid outward as guided by the shelf portion 28*d*.

Referring to FIGS. 1, 2, 6 and 11-15, each of the two half shells 20, 21 includes a housing side outlet opening 30. In particular, the housing side outlet openings 30 are formed in each respective first and second side 5, 6. Each of the housing side outlet openings 30 communicates with the saw housing interior space 18 and is disposed at a location between the front end 3 and the rear end 4 at a location corresponding to the outlet end 103(2) of the electric motor housing 103. In addition, each of the housing side outlet openings 30 is disposed at a location that is spaced apart from the third (top) and fourth (bottom) sides 7, 8.

The housing side outlet opening 30 of the right-side half shell 21 communicates with the second compartment 18(2) near the saw housing front end 3. The housing side outlet opening 30 of the left-side half shell 21 similarly located on the opposite side of the saw housing 2 and communicates with the third compartment 18(3).

Each housing side outlet opening 30 is constituted by a series of closely-spaced, narrow slots 30*a*. The material between the slots 30*a* forms a grill configured to prevent material having dimensions greater than a width of the slot 30*a* from entering the interior space 18. In the illustrated embodiment, the slots 30*a* extend at an acute angle relative to the vertical, for example, at a 30 degree angle relative to the vertical. However, in other embodiments, the slots 30*a* may extent vertically or horizontally.

The slots 30*a* are formed through the thickness of the corresponding first and second side 5, 6 in such a way that the surfaces 30*b* of each of the slots 30*a* are parallel to a line that is normal to the portion of the respective first and second side 5, 6 in which the housing side outlet opening 30 is formed. By this configuration, air exits the interior space 18 via the slots 30*a* in a direction normal to the portion of the respective first and second side 5, 6 in which the housing side outlet opening 30 is formed. In particular, as seen in a top view of the cut-off saw 1 (FIG. 8), each housing side outlet opening 30 is configured to discharge air from the housing interior space 18 in a direction represented by arrow A1 that is at a first angle $\theta 1$ relative to the housing longitudinal axis 9. In the illustrated embodiment, the first angle $\theta 1$ is substantially perpendicular to the longitudinal axis 9, and thus is oriented so that air flowing out of each housing side outlet opening 30 is laterally-outwardly directed. In addition, as seen in a rear view of the cut-off saw 1 (FIG. 7), each housing side outlet opening 30 is configured to discharge air from the housing interior space 18 in a direction represented by arrow A2 that is at a second angle $\theta 2$ relative to the housing longitudinal axis 9. In the illustrated embodiment, the second angle $\theta 2$ is approximately 90 degrees to the housing longitudinal axis 9 so that air flowing out of each housing side outlet opening 30 is directed laterally.

The saw housing 2 includes housing features that are configured to prevent or inhibit entrance of liquid (i.e., water) into the interior space via the housing side outlet openings 30. The housing features include a shelf 32 disposed at each housing side outlet opening and housing wall portions 35 that cooperate with the shelf 32 to minimize water infiltration.

Each shelf 32 protrudes inward from an interior surface of each of the respective first and second sides 5, 6 of the saw housing 2 at a location corresponding to the housing side outlet openings 30. Each shelf 32 has a proximal end 33 that adjoins the respective housing side 5, 6 and a distal end 34 that is opposite the proximal end 33 and is spaced apart from the respective housing side 5, 6. The distal end 34 of each shelf 32 adjoins, or is closely spaced with respect to, a housing wall portion 35 that faces the housing side outlet opening 30.

The shelf 32 is cantilevered from the housing 2. The shelf 32 may be perpendicular to the housing 2 or may be slightly angled relative to the housing 2 to promote flow of liquid toward the exterior of the housing 2. In some embodiments, the shelf 32 extends at a shelf angle $\theta s$ relative to the first side, and the shelf angle $\theta s$ is an acute angle relative to a plane P that includes the housing side outlet opening 30 (FIG. 11).

The shelf 32 is disposed between the respective housing side outlet opening 30 and the fourth (bottom) side 8. In the illustrated embodiment, the shelf 32 is aligned with a lower edge of the grill defined by the slots 30*a*.

In addition to the shelf 32, the housing features that are configured to prevent or inhibit entrance of liquid into the interior space include the facing wall portion 35. The facing wall portion 35 extends upward relative to the shelf distal end 34 toward the housing third (top) side 7. By this configuration, the facing wall portion 35 provides a stop surface or shield that inhibits (e.g., blocks or partially blocks) entry of liquid into the housing 2 and deflects liquid outward as guided by the shelf 32. In some embodiments, the wall portion 35 is integral with the shelf distal end 34, while in other embodiments, the wall portion 35 is a separate structural element that is closely adjacent to the shelf distal end 34.

With respect to the housing side outlet opening 30 provided in the right-side half shell 21 (e.g., in the first side 5), the facing wall portion 35(1) is constituted in part by a wall portion 101(1) of the motor housing 101 and in part by a protruding wall portion 10(1) of the support arm 10. The support arm protruding wall portion 10(1) cooperates with the motor housing wall portion 101(1) to provide a substantially continuous surface that faces the housing side outlet opening 30 with no intervening structures. In the illustrated embodiment, the facing wall portion 35(1) has a surface area of at least the size of the area of the housing side outlet opening 30 that it faces.

With respect to the housing side outlet opening 30 provided in the left-side half shell 20 (e.g., in the second side 6), the facing wall portion 35(2) is constituted in part by a portion 43(2) of the third partitioning wall 43 and in part by a portion 48(2) of an exterior surface of a baffle 48 that protrudes from the third partitioning wall 43 toward the second side 6. The baffle 48 is tubular, has a generally rectangular cross sectional shape and defines an enclosed path that redirects air flow therethrough through a ninety degree change in direction. Although they are relatively offset, the portion 43(2) of the third partitioning wall 43 and the portion 48(2) of the exterior surface of a baffle 48 each face the housing side outlet opening 30 with no intervening structures. In combination, the portion 43(2) of the third partitioning wall 43 and the portion 48(2) of the exterior surface of a baffle 48 that constitute the facing wall portion 35 has a surface area of at least the size of the area of the housing side outlet opening 30 that it faces.

Thus, the housing side outlet opening 30 of each of the first and second sides 5, 6 includes a shelf 32 and a facing wall portion 35 that provides a stop surface that blocks or partially blocks entry of liquid into the housing 2 and deflects liquid outward as guided by the shelf 32.

As further regards the housing side outlet opening 30 provided in the second side 6, the baffle 48 encloses the opening 46 in the third partitioning wall 43 and opens facing the rear end 4. In effect, the baffle 48 provides an enclosed passageway that redirects airflow from the second compartment 18(2) to the third compartment 18(3) through a ninety degree turn. In particular, air flow discharged from the motor fan 100 exits the second compartment 18(2) laterally via the opening 46 in the third partitioning wall 43 and is redirected to flow in a longitudinal direction by the baffle 48, which opens facing the fourth partitioning wall 44. Air flow exiting the baffle 48 impinges on the fourth partitioning wall 44 and is again redirected by the fourth partitioning wall 44 to flow toward the front end 3 and toward the outlet opening 30 of the housing second side 6. By this configuration, the third partitioning wall 43, the fourth partitioning wall 44 and the baffle 48 cooperate to define a tortuous air flow path between the housing side outlet opening 30 of the second side 6 and the second compartment 18(2) which houses the motor 101. The tortuous path is represented by an arrow $A_{T2}$ in FIG. 6.

Although the housing side outlet openings 30 are illustrated herein as being free of louvers, in some embodiments the housing side outlet openings 30 may include louvers that are similar to the louvers 28c provided for the housing rear inlet openings 28.

Although the illustrated embodiment of the saw housing 2 includes a single pair of housing rear inlet openings 28 and a single pair of housing side outlet openings 30, the saw housing 2 is not limited to these openings. In some embodiments, additional inlet and/or outlet openings may be provided. Possible locations for such openings are indicated by faux openings 29, 31. The faux openings 29, 31 have a similar appearance to the housing side outlet openings 30 but do not include through-openings and therefore do not provide fluid communication between the housing interior space 18 and the environment of the saw 1.

Figure 3:
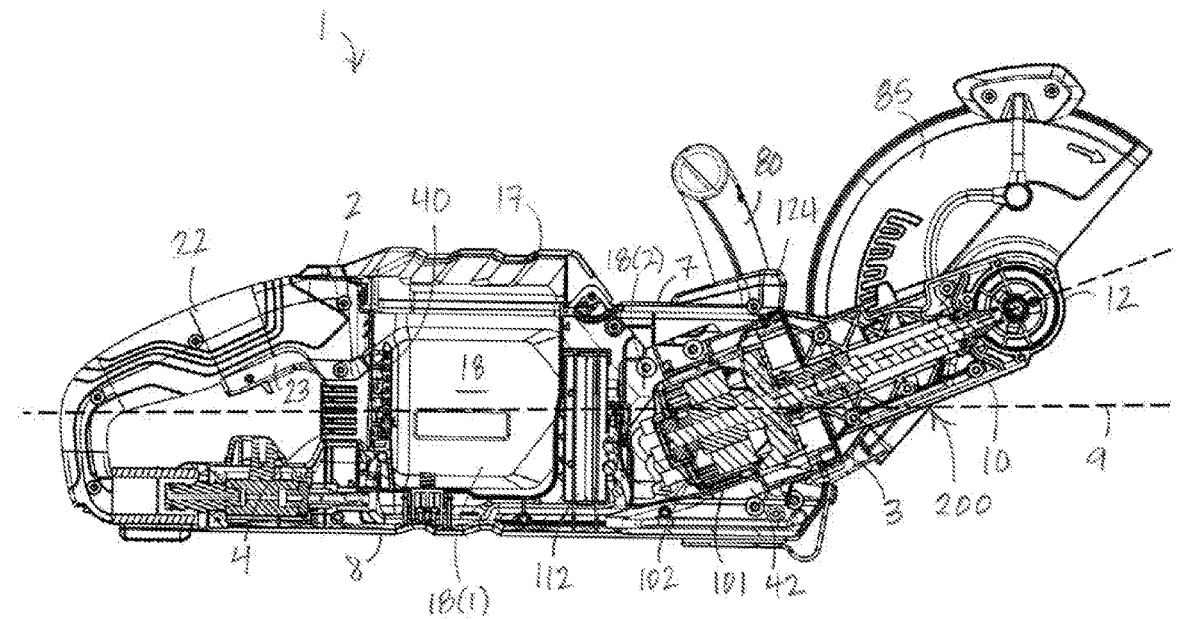
FIG. 3 is a cross-sectional view of the cut-off saw as seen along line 3-3 of FIG. 7.
Figure 5:
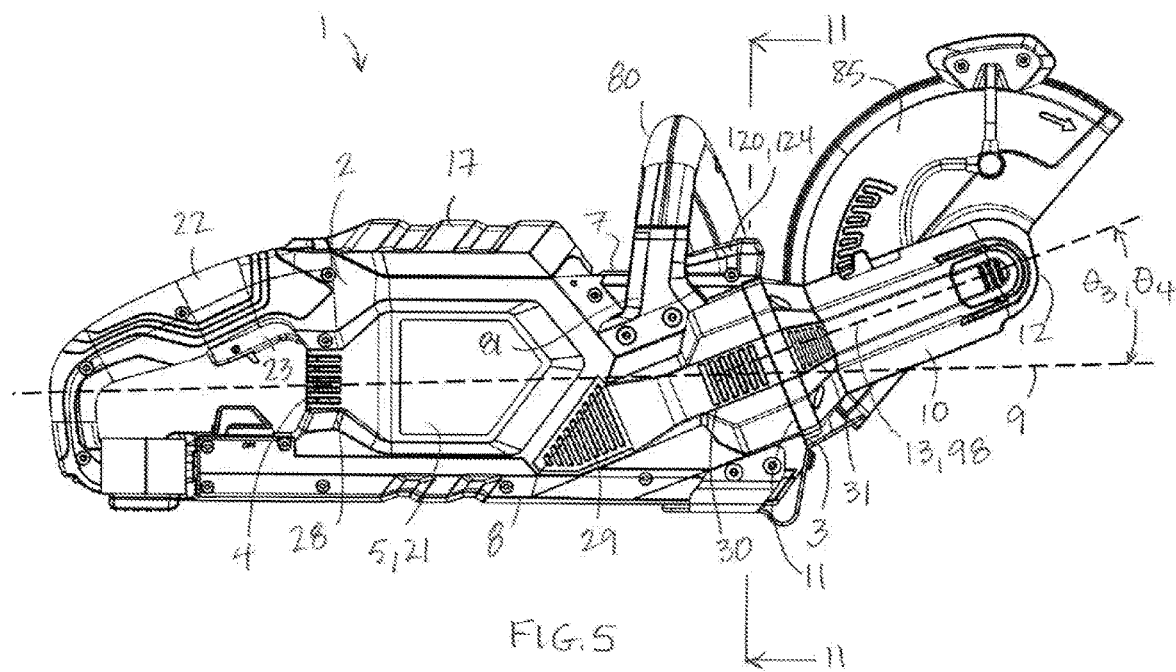
FIG. 5 is a side view of the cut-off saw.
Figure 8:
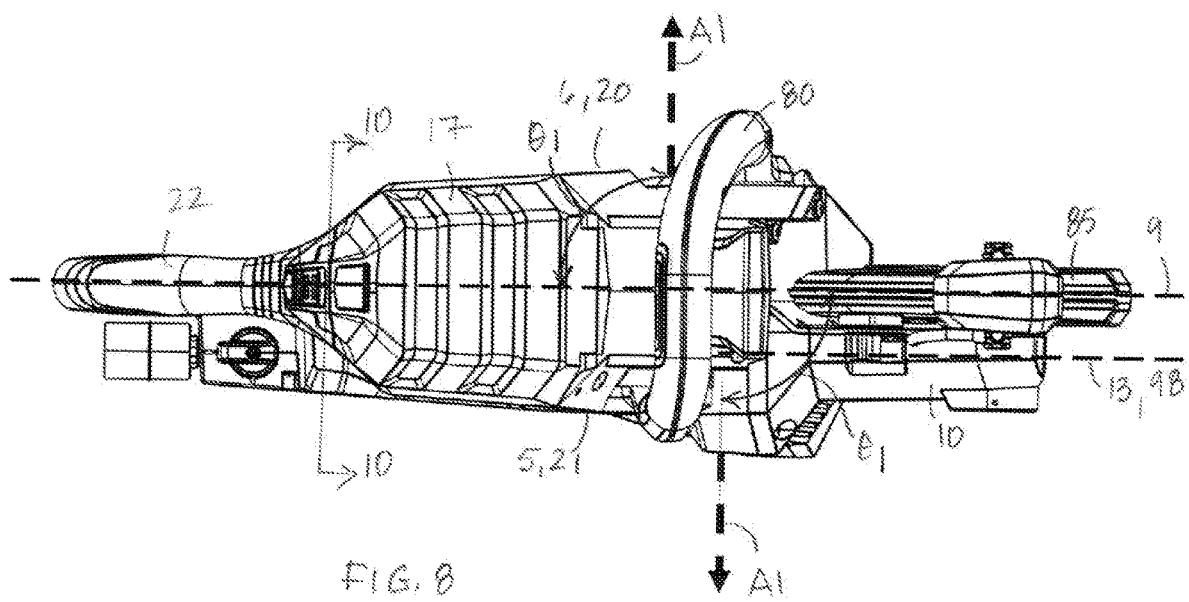
FIG. 8 is a top view of the cut-off saw where broken arrows show air discharge directions.
Figure 9:
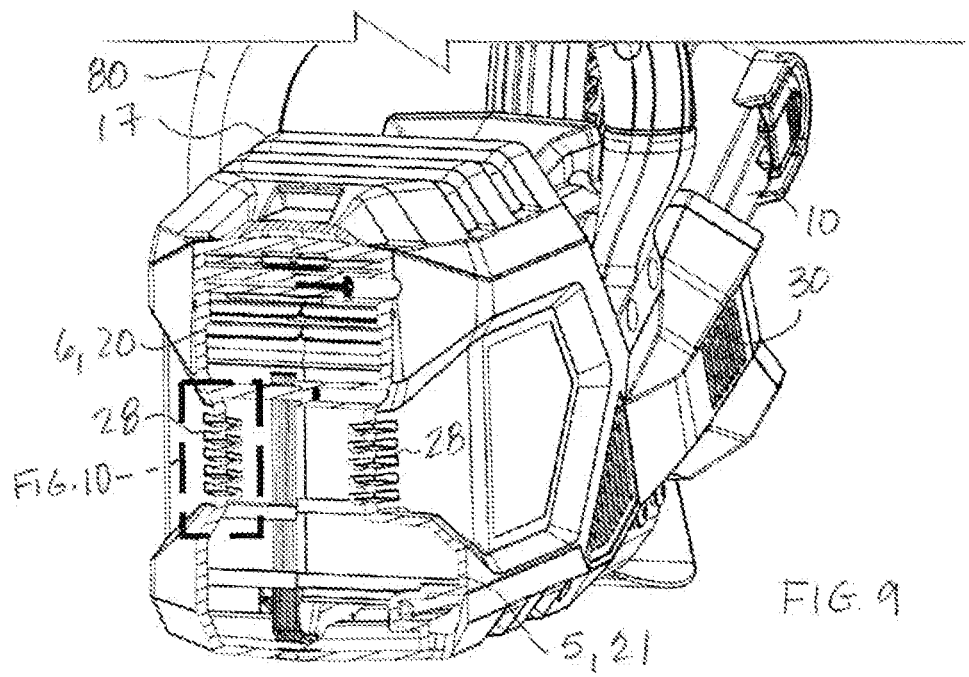
FIG. 9 is a cross-sectional view of the cut-off saw as seen along line 10-10 of FIG. 8.
Figure 10:
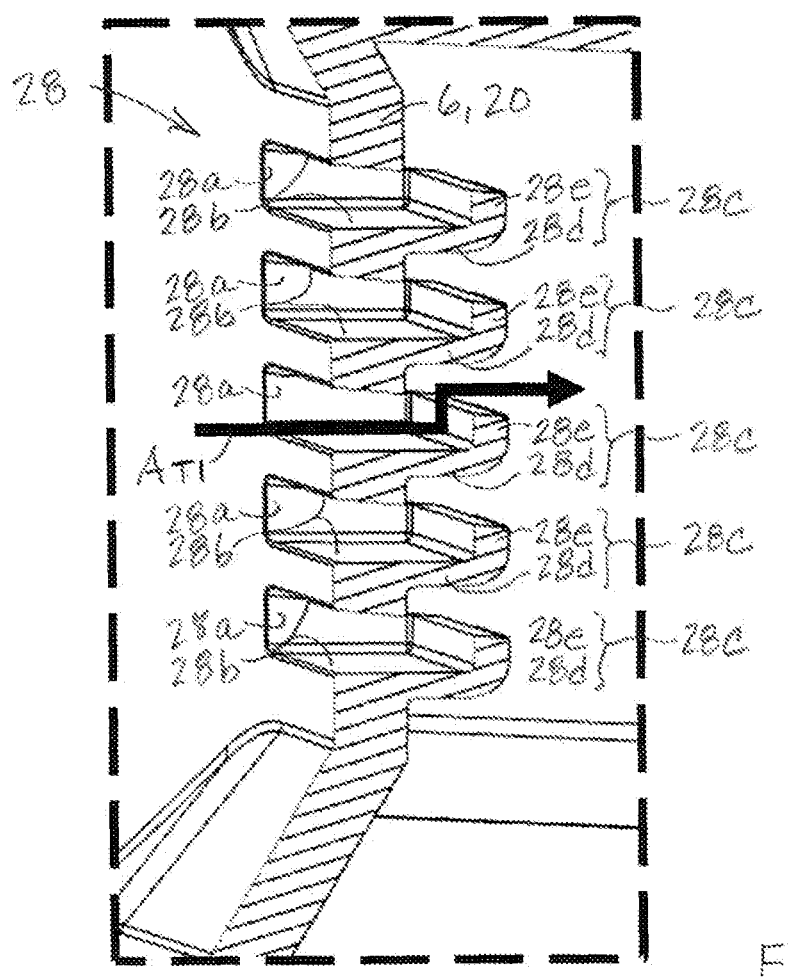
FIG. 10 is an enlarged view of the portion of the cut-off saw of FIG. 9 enclosed in broken lines.
Figure 13:
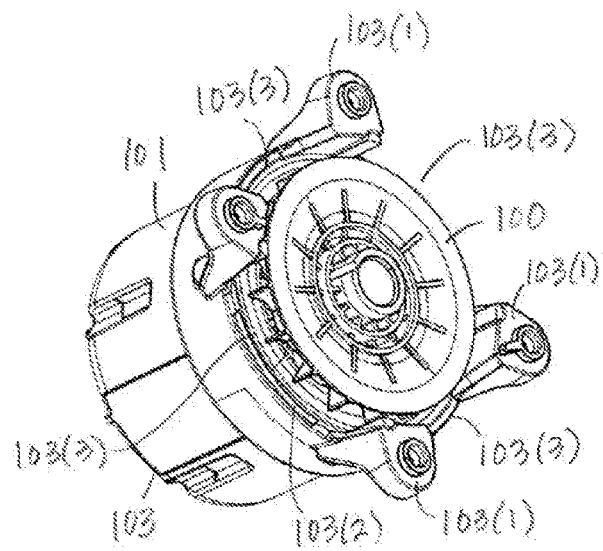
FIG. 13 is a perspective view of the motor.
Figure 14:
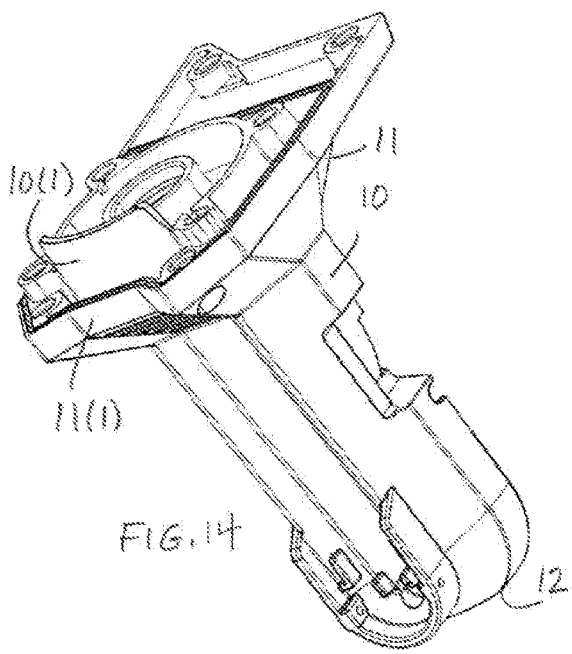
FIG. 14 is a perspective view of the support arm of the saw housing.
Figure 15:
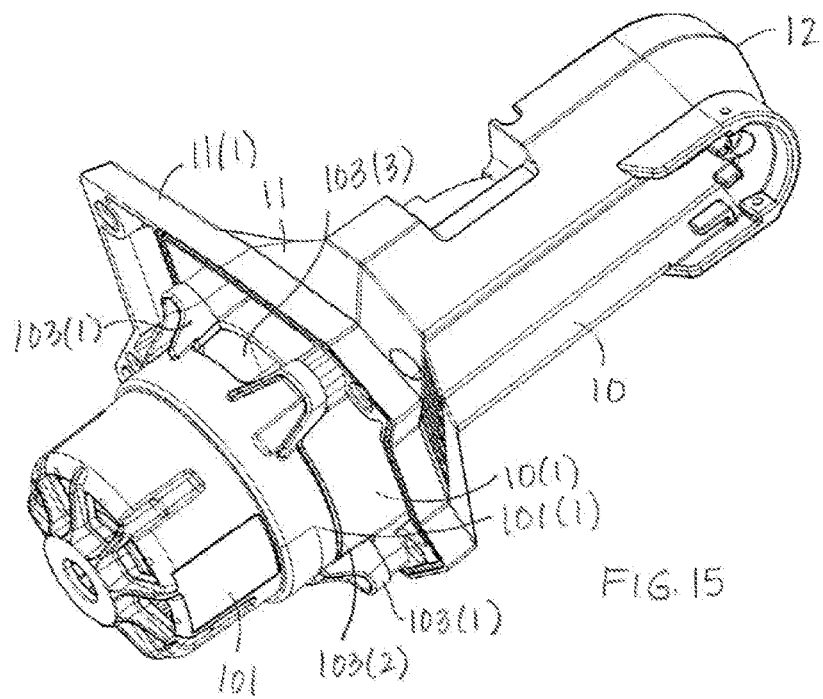
FIG. 15 is a perspective view of the motor assembled with the support arm.

Referring to FIGS. 3, 5 and 8, the right side half shell 21 includes the support arm 10 that protrudes from the front end 3 of the saw housing 2 in a direction opposite that of the main handle 22. The support arm 10 is a hollow, elongated structure that includes a proximal end 11 that is joined to or integral with the front end 3, and a distal end 12 that is opposite the proximal end 11 and supports the cutting blade 90. The support arm 10 includes a support arm axis 13 that extends between the proximal and distal ends 11, 12. Although the proximal end 11 joins the front end 3 at a mid-height of the saw housing 2, the distal end 12 resides above the proximal end 11 such that the support arm axis 13 is angled relative to the saw housing longitudinal axis 9. In particular, as seen in a top view of the cut-off saw 1 (FIG. 8), the support arm axis 13 extends outward from the front end 3 in parallel to the housing longitudinal axis 9. In addition, as seen in a side view of the cut-off saw 1 (FIG. 5), the support arm axis 13 extends at an acute third angle θ3 relative to the housing longitudinal axis 9. In the illustrated embodiment, the third angle θ3 is approximately thirty degrees, but is not limited to this angle.

The proximal end 11 of the support arm 10 includes a base plate 11(1) that cooperates with the half shells 20, 21 to define the saw housing front end 3. The base plate 11(1) may be secured to the half shells 20, 21 for example using fasteners or alternatively may be integrally formed with one of the half shells 20, 21. The support arm 10 includes the protruding wall portion 10(1) that extends into the second compartment 18 at a location that is between the housing first side 5 and the blade drive assembly 200. In the illustrated embodiment, the protruding wall portion 10(1) is shaped and dimensioned to be received in, and fully obstruct, a recess 103(3) of a housing 103 of the motor 101. More specifically, the protruding wall portion 10(1) is configured to be received in a recess 103(3) that faces the housing first side 5. As previously discussed, the protruding wall portion 10(1) serves as a shield and cooperates with the motor housing 103 to form a facing wall portion 35 that inhibits the flow of liquid into the saw housing 2.

In the illustrated embodiment, the cut-off saw 1 also includes an auxiliary handle 80 that is connected to the saw housing 2 between the front and rear ends 3, 4. The main handle 22 and the auxiliary handle 80 provide grip areas to facilitate two-handed operation of the cut-off saw 1. The auxiliary handle 80 is a curved bar that wraps around three sides of the cut-off saw 1. In particular, the auxiliary handle 80 includes an auxiliary handle first end 81 that is joined to the saw housing first side 5 (e.g., one lateral side of the saw housing 2) and an auxiliary handle second end 82 that is joined to the saw housing second side 6 (e.g., the opposed lateral side of the saw housing 2). A mid-portion 83 of the auxiliary handle 80 is disposed between the auxiliary handle first and second ends 81, 82 and overlies the saw housing third side 7 (e.g., a top side of the saw housing 2). The auxiliary handle first and second ends 81, 82 are joined to the sides 5, 6 of the saw housing 2 at a location that is longitudinally disposed between the housing side inlet opening 29 and the housing side outlet opening 30. The auxiliary handle first end 81 is joined to the first side 5 of the saw housing 2 at a location that is closer to the third side 7 than to the fourth side 8, and the auxiliary handle second end is joined to the second side 6 of the saw housing 2 at a location that is closer to the fourth side 8 than the third side 7.

Referring to FIGS. 3-6, 8 and 13, the battery pack 116 is disposed in the first compartment 18(1) and is detachably connected to a battery mount that is located inside the first compartment 18(1). The battery mount mechanically interconnects the battery pack 116 to the first compartment 18(1). The battery mount also includes electrical terminals (not shown) that electrically connect with corresponding electrical terminals on the battery pack 116 during insertion of the battery pack 116 into the first compartment 18(1). The illustrated battery pack 116 is a power tool battery pack having a plurality of rechargeable battery cells 117. The battery cells 117 may be lithium-based or have any other suitable chemistry.

The electric motor 101 is disposed in the second compartment 18(2). The electric motor 101 may be a brushless direct-current motor but is not limited to this type of motor. Operation of the motor 101 is controlled by the controller. The electric motor 101 is housed in a generally cylindrical motor housing 103. The motor housing 103 is supported by the saw housing 2 in an angled orientation relative to the housing longitudinal axis 9 and is fixed in this orientation by fasteners received in mounting bosses 103(1) formed in a first end (e.g., outlet end) 103(2) of the motor housing 103. The motor housing 103 includes a recess 103(3) between the bosses 103(1) of each adjacent pair of bosses. In the illustrated embodiment, the motor housing 103 includes four bosses 103(1) and four recesses 103(3), whereby the motor housing first end 103(2) has a scalloped appearance. In other embodiments, a greater or fewer number of bosses 103(1) may be employed.

The output shaft 102 of the motor 101 protrudes from the motor housing first end 103(2) and rotates about an output shaft axis 98 that is aligned with the support arm axis 13. As seen in a top view of the cut-off saw 1 (FIG. 8), the output shaft axis 98 extends toward the front end 3 in parallel to the housing longitudinal axis 9. In addition, as seen in a side view of the cut-off saw 1 (FIG. 5), the output shaft axis 98 extends at an acute fourth angle θ4 relative to the housing longitudinal axis 9. In the illustrated embodiment, the fourth angle 84 is approximately thirty degrees to correspond to the angle of the support arm axis 13.

A motor fan 100 is mounted on the output shaft 102 at a location between the electric motor 101 and the housing front end 3. The motor fan 100 rotates in concert with the output shaft 102 and draws air through a housing 103 of the motor 101. The motor fan 100 also enhances air flow within the housing interior space 18 by drawing air from the rear end 4 toward the front end 3 as discussed in further detail below. In the illustrated embodiment, the bosses 103(1) of the motor housing 103 surround an outer periphery of the motor fan 100. Although the recess 103(3) that faces the housing first side 5 and the housing side outlet opening 30 is obstructed by the protruding wall portion 10(1), the remaining recesses 103(3) are unobstructed. By this configuration, the remaining recesses 103(3) of the motor housing 103 (e.g., three of the four recesses 103(3)) permit air exhausted by the motor fan to exit the motor housing 103 in a direction perpendicular to the output shaft axis 98.

Figure 4:
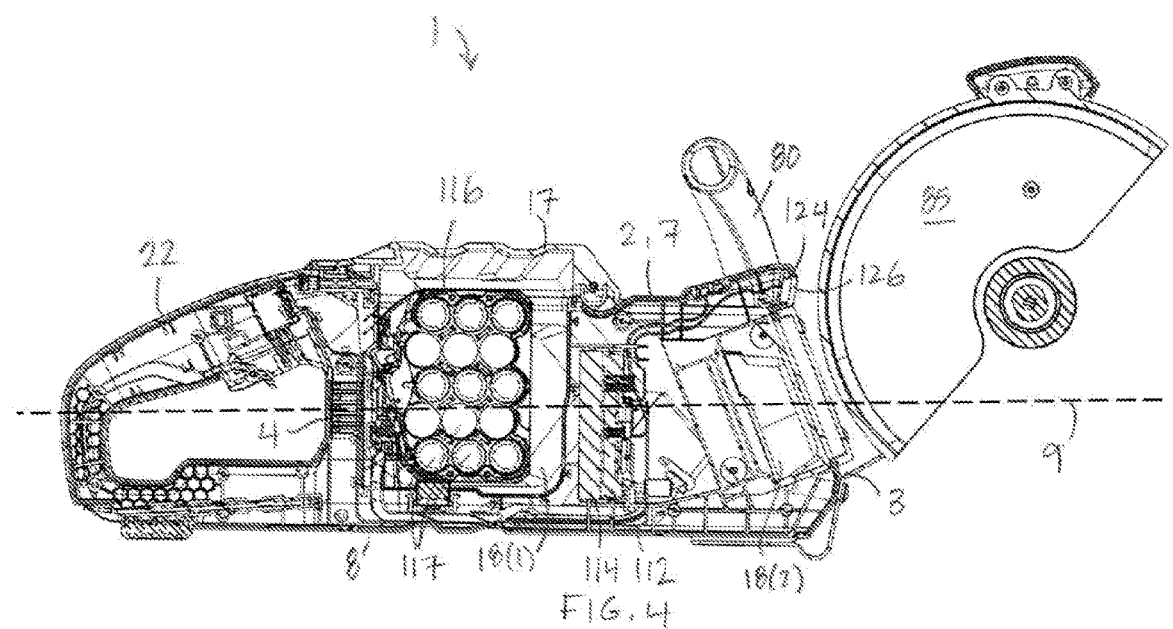
FIG. 4 is a cross-sectional view of the cut-off saw as seen along line 4-4 of FIG. 7.

Referring to FIGS. 4 and 6, the PCBA 112 is a completed printed circuit board assembly that includes the PCB and contains the controller and other electronic components needed to make the board function as required. The PCBA 112 is mounted on a heat sink 114. The PCBA 112 and the heat sink 114 are disposed in the space 18(4) and are supported therein via a PCBA holder 113 in such a way that the PCB resides in a plane that is perpendicular to the housing longitudinal axis 9. The heat sink 114 is a thermally conductive plate that is joined to the rear-facing surface of the PCBA 112. The heat sink 114 includes cooling fins 115 that extend in a direction parallel to the first and second (lateral) sides 5, 6 and protrude toward the rear end 3.

In the illustrated embodiment, the PCBA holder 113 is supported via a fifth partitioning wall 45 that extends laterally between the PCBA holder 113 and the first and second sides 5, 6 of the saw housing 2. The fifth partitioning wall 45 is parallel to the first and second partitioning walls 41, 42, and disposed in the space 18(4) between the second partitioning wall 42 and the fourth partitioning wall 44.

In the illustrated embodiment, the motor 101 and the battery pack 116 together form a high power battery-powered system. For example, in some embodiments, the motor 101 and the battery pack 116 are operable to produce a high power output. For example, the motor 101 and the battery pack 116 may produce a peak power of 1800 watts (W) to 2400 W or more (2.4 horsepower (hp) to 3.0 hp or more). This power output is equal to or greater than the power output of some single-cylinder internal combustion engines typically used in cut-off saws.

Figure 2:
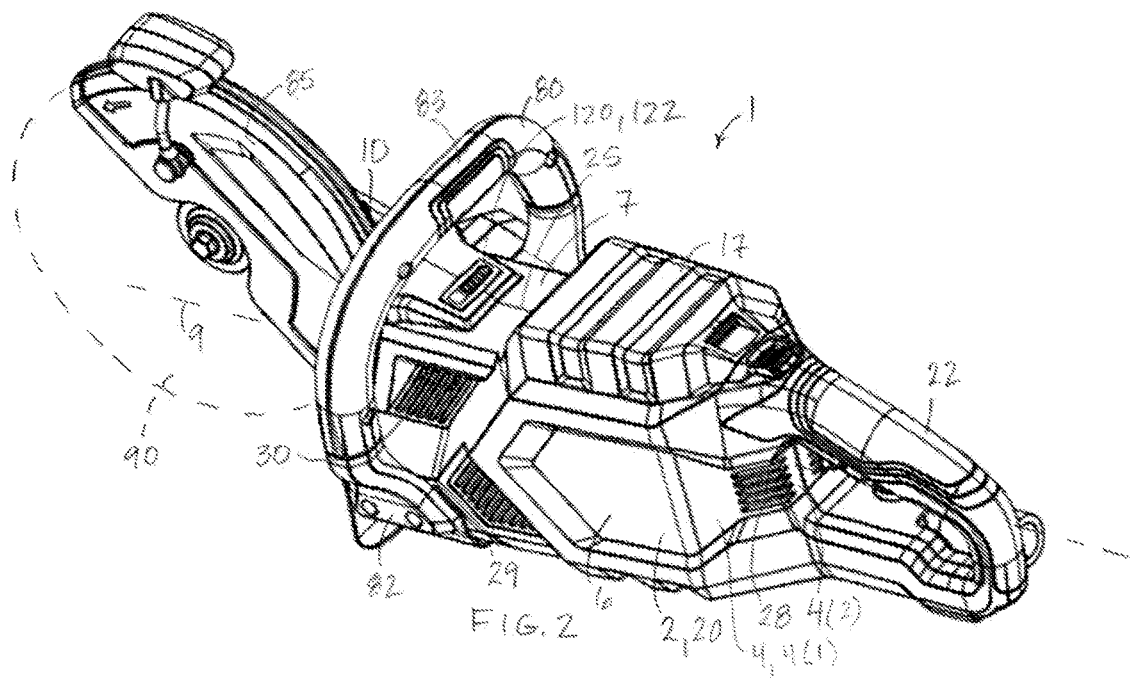
FIG. 2 is a perspective view of a second side of the cut-off saw.

Referring to FIGS. 1-3, a trigger 23 for operating the cut-off saw 1 is located on the main handle 22. The trigger 23 is configured so that a user may depress the trigger 23 using fingers of the hand which grips the main handle 22, whereby the electric motor 101 is actuated.

The cut-off saw 1 includes a human machine interface (HMI) 120 to assist a user in operating the cut-off saw 1. In the illustrated embodiment, the HMI includes a battery charge level display 122 surrounded by a sturdy protective frame 124. The HMI 120 is positioned on the saw housing 2 within a line of sight of a user during operation of the cut-off saw 1. For example, the HMI 120 may be positioned on the third side (top) of the saw housing 2 between the battery cover (detachable lid) 17 and the front end 3.

In other embodiments, the HMI may alternatively, or additionally, include a liquid crystal display (LCD) screen that is surrounded by the sturdy protective frame 124. The LDC screen may display the battery charge level and/or other information of interest to the saw user, including but not limited to indication of an amount of power being used by the cut-off saw 1 during operation (i.e., an amount of current being drawn from the battery pack 116 or other operational information. In other embodiments, the HMI 120 may be positioned on other locations on the saw housing 2.

The cut-off saw 1 also includes a light source 126 provided on a forward-facing surface of the protective frame 124. The light source 126 may include one or more light emitting diodes (LEDs) that are arranged to illuminate the work area in front of the saw and/or a work piece disposed in this area.

Selective illustrative embodiments of the cut-off saw are described above in some detail. Only structures considered necessary for clarifying the cut-off saw have been described herein. Other conventional structures, and those of ancillary and auxiliary components of the cut-off saw are assumed to be known and understood by those skilled in the art. Moreover, while a working example of the cut-off saw has been described above, the cut-off saw is not limited to the working example described above, but various design alterations may be carried out without departing from the cut-off saw as set forth in the claims.

What is claimed, is:

1. A saw, comprising:
a saw housing, the saw housing including a front end, a rear end, a first side, a second side, a third side, a fourth side, a longitudinal axis that extends through the front end and the rear end, and a hollow support arm that protrudes outward from the front end, the rear end being opposite the front end, the first side, the second side, the third side, the fourth side, the front end and the rear end cooperating to define an interior space of the saw housing, the rear end including a housing rear inlet opening that permits fluid communication between an environment of the saw and the interior space, the first side including a housing side outlet opening disposed between the rear end and the front end, the housing side outlet opening permitting fluid communication between the environment of the saw and the interior space;
an electric motor disposed in the interior space, the electric motor including an output shaft that lies in a plane that is parallel to the longitudinal axis and is rotatable about an output shaft axis;
a motor fan driven by the output shaft and configured to draw cooling air through the saw housing;
a blade drive assembly disposed in the support arm, the blade drive assembly configured to detachably connect a cutting blade to the support arm and transmit a rotational motion of the output shaft to the cutting blade when the cutting blade is connected to the saw; and
a printed circuit board assembly that supports electronics configured to control operation of the saw, the printed circuit board assembly being disposed in the interior space;
wherein
the saw housing includes housing features that are configured to minimize entrance of water into the interior space.

2. The saw of claim 1, wherein
the first side and the second side corresponding to opposed lateral sides of the saw housing, the third side corresponds to a top of the saw housing and the fourth side of the saw housing corresponds to a bottom of the saw housing, the saw comprises a handle having a first end connected to the first side, a second end connected to the second side and a mid portion that faces and is spaced apart from the third side, the housing side outlet opening is disposed in the first side between the third side and the fourth side, and the housing features comprise a shelf that protrudes inward from an interior surface of the first side, the shelf disposed between the housing side outlet opening and the fourth side.

3. The saw of claim 2, wherein
the shelf comprises a proximal end that adjoins the first side and a distal end that is opposite the proximal end and spaced apart from the first side, and
the housing features comprise a facing wall disposed at the shelf distal end, the facing wall extending upward relative to the shelf toward the third side.

4. The saw of claim 2, wherein the shelf protrudes inward from an interior surface of the first side at a shelf angle relative to the first side, the shelf angle being configured to promote the flow of liquid to an exterior of the saw housing.

5. The saw of claim 2, wherein the shelf protrudes inward from an interior surface of the first side at a shelf angle relative to the first side, and the shelf angle is an acute angle relative to a plane that includes the housing side outlet opening.

6. The saw of claim 2, wherein the housing side outlet opening is disposed in the first side at a location that is longitudinally aligned with the motor.

7. The saw of claim 2, wherein
each of the housing rear inlet opening and the housing side outlet opening comprises an array of slots, the material between the slots forming a grill configured to prevent material having dimensions greater than a width of the slot from entering the interior space, and
the shelf is disposed along an edge of the grill.

8. The saw of claim 1, wherein the housing features comprise:
an upright wall portion that faces the housing outlet opening and is spaced apart from the housing outlet opening; and
a shelf that underlies the housing outlet opening and protrudes inward from the first side toward the upright wall portion.

9. The saw of claim 1, wherein the housing features comprise wall portions disposed in the interior space, the wall portions arranged to provide a tortuous fluid path between at least one of the housing rear inlet opening and the housing side outlet opening and at least one of the motor and the printed circuit board assembly.

10. The saw of claim 9, wherein at least a first one of the wall portions is parallel or substantially parallel to the longitudinal axis, and at least a second one of the wall portions is perpendicular to the first one of the wall portions.

11. The saw of claim 9, wherein at least some of the wall portions are arranged to form an enclosed passage portion.

12. The saw of claim 9 wherein the housing features include a tubular baffle that forms a portion of a tortuous air flow path in the interior space.

13. The saw of claim 1, wherein each of the housing rear inlet opening and the housing side outlet opening comprises an array of slots, the material between the slots forming a grill configured to prevent material having dimensions greater than a width of the slot from entering the interior space.

14. The saw of claim 1, including a battery pack disposed in the interior space between the electric motor and the rear end, the battery pack configured to supply power to the electric motor.

15. The saw of claim 1, wherein
the motor is housed within a motor housing,
the motor housing includes
a motor housing first end,
mounting bosses that are spaced apart about a circumference of the motor housing first end, the mounting bosses configured to receive a fastener, and
recesses that are formed in the motor housing first end such that one of the recesses is disposed between the mounting bosses of each adjacent pair of mounting bosses,
the output shaft protrudes from the motor housing first end, and
the housing features include a shielding wall portion that protrudes from an inner surface of the saw housing into one of the recesses, the shielding wall portion serving as a barrier to liquid flow through the recess.

16. The saw of claim 15, wherein the shielding wall portion is shaped and dimensioned to complement the shape and dimension of the one of the recesses in such a way that motor housing and the shielding wall portion cooperate to inhibit the flow of liquid into the motor via the one of the recesses.

17. The saw of claim 15, wherein the remaining recesses are free of a shielding wall portion.

18. The saw of claim 15 wherein the shielding wall portion protrudes from a rear-facing surface of the support arm.

19. The saw of claim 15, wherein the housing outlet opening is longitudinally aligned with the shielding wall portion.

* * * * *